United States Patent
Rice et al.

(10) Patent No.: US 10,776,869 B2
(45) Date of Patent: Sep. 15, 2020

(54) SYSTEM INCLUDING AN ELECTRONIC MACHINE PLATFORM WITH MULTI-TIER ENTITY MATCHING

(71) Applicant: The Nasdaq Private Market, LLC., San Francisco, CA (US)

(72) Inventors: Robert Eric Rice, Short Hills, NJ (US); Michael Chapman, Rockville, MD (US)

(73) Assignee: THE NASDAQ PRIVATE MARKET, LLC, San Francisco, CA (US)

( * ) Notice: Subject to any disclaimer, the term of this patent is extended or adjusted under 35 U.S.C. 154(b) by 891 days.

(21) Appl. No.: 14/863,385

(22) Filed: Sep. 23, 2015

(65) Prior Publication Data

US 2016/0086273 A1 Mar. 24, 2016

Related U.S. Application Data

(60) Provisional application No. 62/053,973, filed on Sep. 23, 2014.

(51) Int. Cl.
G06Q 40/00 (2012.01)
G06Q 40/04 (2012.01)
G06Q 30/08 (2012.01)

(52) U.S. Cl.
CPC ............ *G06Q 40/04* (2013.01); *G06Q 30/08* (2013.01)

(58) Field of Classification Search
CPC ........ G06Q 40/00; G06Q 40/04; G06Q 40/06; G06Q 30/00; G06Q 30/102; G06Q 20/40; G06Q 30/02; G06Q 30/06

(Continued)

(56) References Cited

U.S. PATENT DOCUMENTS

| 8,175,955 B2* | 5/2012 | Friesen | G06Q 20/10 705/36 R |
| 2005/0027635 A1* | 2/2005 | Monroe | G06Q 20/10 705/37 |

(Continued)

OTHER PUBLICATIONS

Bank for International Settlements, "The Implications of Electronic Trading in Financial Markets", Jan. 2001, Committee on the Global Financial System, pp. 1-37. (Year: 2001).*

(Continued)

*Primary Examiner* — Hani M Kazimi
(74) *Attorney, Agent, or Firm* — Nixon & Vanderhye P.C.

(57) ABSTRACT

A system includes processing circuitry communicatively coupled to a plurality of terminals and a database that includes a first data structure that identifies a plurality of participant entities and that associates each of at least a subset of the participant entities with participant category information, by which the processing circuitry is configured to identify each of the participant entities as being one of three participant category entities, a second data structure that identifies assignable share data structures and respective ones of the plurality of participant entities to which the share data structures are assigned, and a third data structure that identifies offers of the participant entities to unload one or more of the share data structures assigned to the offering participant entities, and offers of the participant entities to obtain assignment of one or more of the share data structures, offers being matched according to a three-tier paradigm.

11 Claims, 8 Drawing Sheets

10

100

| Participant ID 101 | Flag 1 102 | Flag 2 103 |
|---|---|---|
| Participant ID 1 | T1 | T2A |
| Participant ID 2 | T2B | |
| Participant ID N | T2A | |

110

| Offer ID 111 | Participant ID 112 | Offer Value 113 | Offer Period 114 | MIN 115 | MAX 116 | Tier 117 | Security ID 118 | Offer Type 119 |
|---|---|---|---|---|---|---|---|---|
| Offer ID 1 | Participant ID 1 | ## | .. | .. | .. | .. | .. | .. |
| Offer ID 2 | Participant ID 2 | ## | .. | .. | .. | .. | .. | .. |

120

| Share ID 101 | Value 122 | Participant ID 123 |
|---|---|---|
| Share ID 1 | ## | Participant ID N |
| Share ID 2 | ## | Participant ID 2 |
| Share ID N | ## | Participant ID 2 |

(58) Field of Classification Search
USPC .................................................. 705/35–37
See application file for complete search history.

(56) References Cited

U.S. PATENT DOCUMENTS

| | | | |
|---|---|---|---|
| 2005/0091142 A1* | 4/2005 | Renton | G06Q 40/04 705/37 |
| 2005/0171888 A1* | 8/2005 | Daley | G06Q 30/06 705/37 |
| 2005/0171890 A1* | 8/2005 | Daley | G06Q 30/08 705/37 |
| 2005/0171891 A1* | 8/2005 | Daley | G06Q 30/06 705/37 |
| 2006/0020536 A1* | 1/2006 | Renton | G06Q 40/00 705/37 |
| 2007/0226122 A1* | 9/2007 | Burrell | G06Q 20/3821 705/37 |
| 2008/0242421 A1* | 10/2008 | Geisner | A63F 13/792 463/42 |
| 2009/0006266 A1* | 1/2009 | Hanson | G06Q 20/10 705/80 |
| 2011/0040667 A1* | 2/2011 | Montesano | G06Q 30/08 705/37 |
| 2012/0123925 A1* | 5/2012 | Daley | G06Q 40/04 705/37 |
| 2012/0271747 A1* | 10/2012 | Krause | G06Q 40/04 705/37 |
| 2014/0032363 A1* | 1/2014 | Zhao | G06Q 30/0643 705/26.25 |
| 2016/0062754 A1* | 3/2016 | Tripp | G06F 8/70 717/120 |

OTHER PUBLICATIONS

Degryse et al., "Two Shades of Opacity: Hidden Orders versus Dark Trading", Feb. 18, 2015, pp. 1-52. (Year: 2015).*

* cited by examiner

| Participant ID 101 | Flag 1 102 | Flag 2 103 |
|---|---|---|
| Participant ID 1 | T1 | T2A |
| Participant ID 2 | T2B | |
| Participant ID N | T2A | |

110

| Offer ID 111 | Participant ID 112 | Offer Value 113 | Offer Period 114 | MIN 115 | MAX 116 | Tier 117 | Security ID 118 | Offer Type 119 |
|---|---|---|---|---|---|---|---|---|
| Offer ID 1 | Participant ID 1 | ## | : | : | : | : | : | : |
| Offer ID 2 | Participant ID 2 | ## | : | : | : | : | : | : |

120

| Share ID 101 | Value 122 | Participant ID 123 |
|---|---|---|
| Share ID 1 | ## | Participant ID N |
| Share ID 2 | ## | Participant ID 2 |
| Share ID N | ## | Participant ID 2 |

10

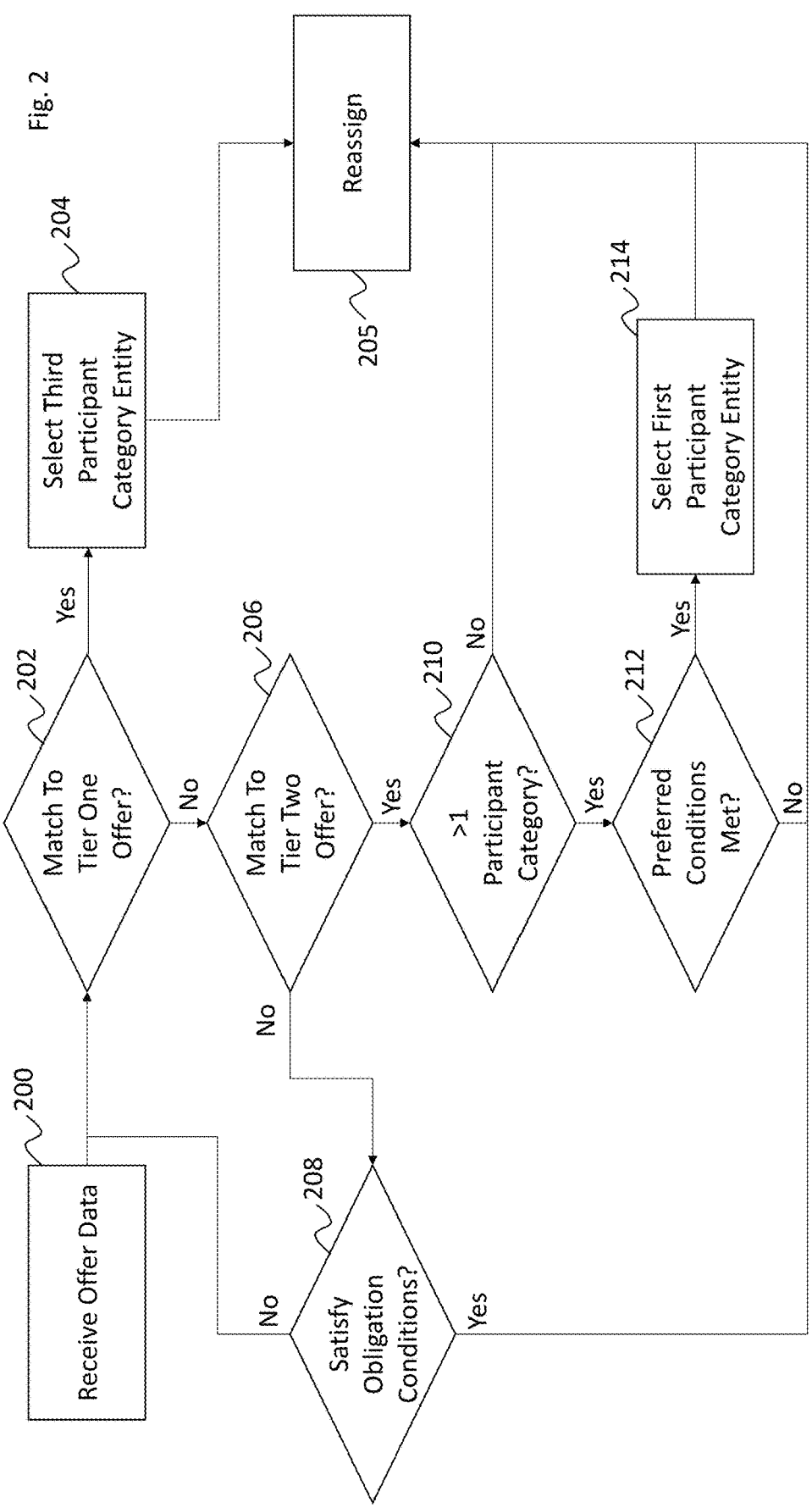

SYSTEM INCLUDING AN ELECTRONIC MACHINE PLATFORM WITH MULTI-TIER ENTITY MATCHING

CROSS REFERENCE TO RELATED APPLICATION

This application claims priority to U.S. Provisional Patent Application No. 62/053,973, filed Sep. 23, 2014, which is hereby incorporated by reference in its entirety for all purposes.

FIELD

The present invention relates to a system that includes an electronic machine platform with data structures and algorithmic processing with multi-tier matching of participant-entity associated data for reassignment of security share data structures.

BACKGROUND

A machine platform is used for providing an electronic environment by which entities are able to provide for reassignment of data structures, which correspond to ownership interests, between the entities. Such a system generally stores in a database in relational association with each other identifications of security shares, respective entity assignments, and, where input, respective offers to unload. Such a system also obtains offers to obtain shares that are offered to be unloaded, which offers are input via communicatively connected terminals, and executes a matching algorithm to match the offers on both sides to accordingly facilitate reassignment of the shares in the database. Such systems are suitable for providing a platform for historically highly illiquid assets.

SUMMARY

The present invention is directed to a machine platform that creates an electronic environment that generate liquidity for assets which have historically been illiquid, such as private equity and real assets. The platform includes a system processing circuitry communicatively coupled to electronic terminals which can be operated by users for entering offer information according to which the processing circuitry executes a matching algorithm to reassign security share data structures, i.e. instantiations of a data structure, between respective entities indicated by the respective users when matching conditions, based on the respective offers on opposite transaction sides, are met. The processing circuitry is coupled to a database that maintains a data structure that is usable by the processing circuitry, executing the algorithm, to control a tri-tier reassignment paradigm.

According to an example embodiment of the present invention, a system includes a matching machine that includes processing circuitry communicatively coupled to a plurality of terminals, and further includes a database. The database includes a first data structure that identifies a plurality of participant entities and that associates each of at least a subset of the participant entities with participant category information, by which the processing circuitry is configured to identify each of the participant entities as being at least one of a first participant category entity, a second participant category entity, and a third participant category entity; a second data structure that identifies assignable share data structures and respective ones of the plurality of participant entities to which the share data structures are assigned; and a third data structure that identifies offers of the participant entities to unload one or more of the share data structures assigned to the offering participant entities, and offers of the participant entities to obtain assignment of one or more of the share data structures. The processing circuitry is configured to update the second and third data structures and match one or more of the offers to unload with one or more of the offers to obtain assignment in real time as the offers are obtained from the plurality of terminals. The update and matching is performed by executing a three-tier matching algorithm according to which, for each of the offers to unload, if the respective offer can be matched to an offer to obtain assignment which is associated in the database with a first-tier, the processing circuitry matches the respective offer to obtain assignment with the first-tier offer and reassigns the offered share data structure in the database with a participant entity which is indicated in the database to be of the third participant category, and otherwise: if the respective offer cannot be matched with any offer to obtain assignment and any predefined obligation requirement conditions are satisfied, the processing circuitry reassigns the offered share data structure in the database with a participant entity which is indicated in the database to be of the first participant category; as long as the respective offer cannot be matched with any offer to obtain assignment and one or more predefined obligation requirement conditions are not satisfied, the offered share data structure is not reassigned; if the respective offer can be matched with at least one offer to obtain assignment, and all offers to obtain assignment with which the respective offer to unload can be matched are associated with a same offering participant category, the processing circuitry reassigns the offered share data structure in the database with a participant entity which is indicated in the database to be of the same participant category with which the offers to obtain assignment are associated; if the respective offer can be matched with an offer to obtain assignment associated in the database with the first participant category and an offer to obtain assignment associated in the database with the second participant category, and a preference condition is satisfied, the processing circuitry reassigns the offered share data structure in the database with a participant entity which is indicated in the database to be of the first participant category; and if the respective offer can be matched with an offer to obtain assignment associated in the database with the first participant entity category and an offer to obtain assignment associated in the database with the second participant entity category, and the preference condition is not satisfied, the processing circuitry performs non-preference matching to select one of the offers to obtain for matching to the offer to unload and reassigns the offered share data structure in the database with a participant entity which the selected offer is associated.

In an example embodiment, the third data structure includes information concerning the first-tier offer, which specifies a maximum number of share data structures, for obtaining assignment of which the first-tier offer is made.

In an example embodiment, for all first-tier offers, a number of monetary units offered for obtaining assignment of a share data structure, cannot be specified by a user.

In an example embodiment, where the respective offer can be matched with the offer to obtain assignment associated in the database with the first participant category and the offer to obtain assignment associated in the database with the second participant category, the preference condition is that a number of monetary units offered by the offer to obtain assignment that is associated with the second participant category is not greater by at least a predefined threshold percentage than a number of monetary units offered by the offer to obtain assignment that is associated with the first participant category.

In an example embodiment, the first tier offer is one entered by a participant entity identified in the database as a third participant category entity, and the underlying assets were initially issued by that participant entity. Further, in an example embodiment, the system provides that the initial issuer participant entity cannot subsequently obtain assignment of the security share data structure after it has been reassigned to a different participant entity record, except by a first-tier match. In an alternative example embodiment, the third participant category entity can also function as a first or second participant category entity to obtain assignment of a security share data structure by a second or third tier match.

The system prioritizes offers, allocates offers, and sets clearing monetary unit numbers. The processing circuitry executes code to determine an offer matching outcome by comparing numerous characteristics of the offers, for example, including timing of entry, offer size (number of security share data structures offered by the respective offer), and minimum monetary unit number, etc., in further consideration of special rights attaching to any preferred participating entity.

The security data structures can be provided as a closed-end but continuously offered fund, in an interval-like manner, where the issuer participant entity may, but is not required to, tender for the outstanding share data structures at, for example, net asset value from time to time.

The features described herein may be combined to form additional embodiments and sub-elements of certain embodiments may form yet further embodiments. This summary is provided to introduce a selection of concepts that are further described below in the detailed description. This summary is intended neither to identify key features or essential features of the claimed subject matter, nor to be used to limit the scope of the claimed subject matter; rather, this summary is intended to provide an overview of the subject matter described in this document. Accordingly, it will be appreciated that the above-described features are merely examples, and that other features, aspects, and advantages of the subject matter described herein will become apparent from the following detailed description, figures, and claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 1 illustrates a database structure according to an example embodiment of the present invention;

FIG. 2 is a flowchart that illustrates an algorithm which is executed by a matching machine according to an example embodiment of the present invention;

DETAILED DESCRIPTION

Figure 3A:
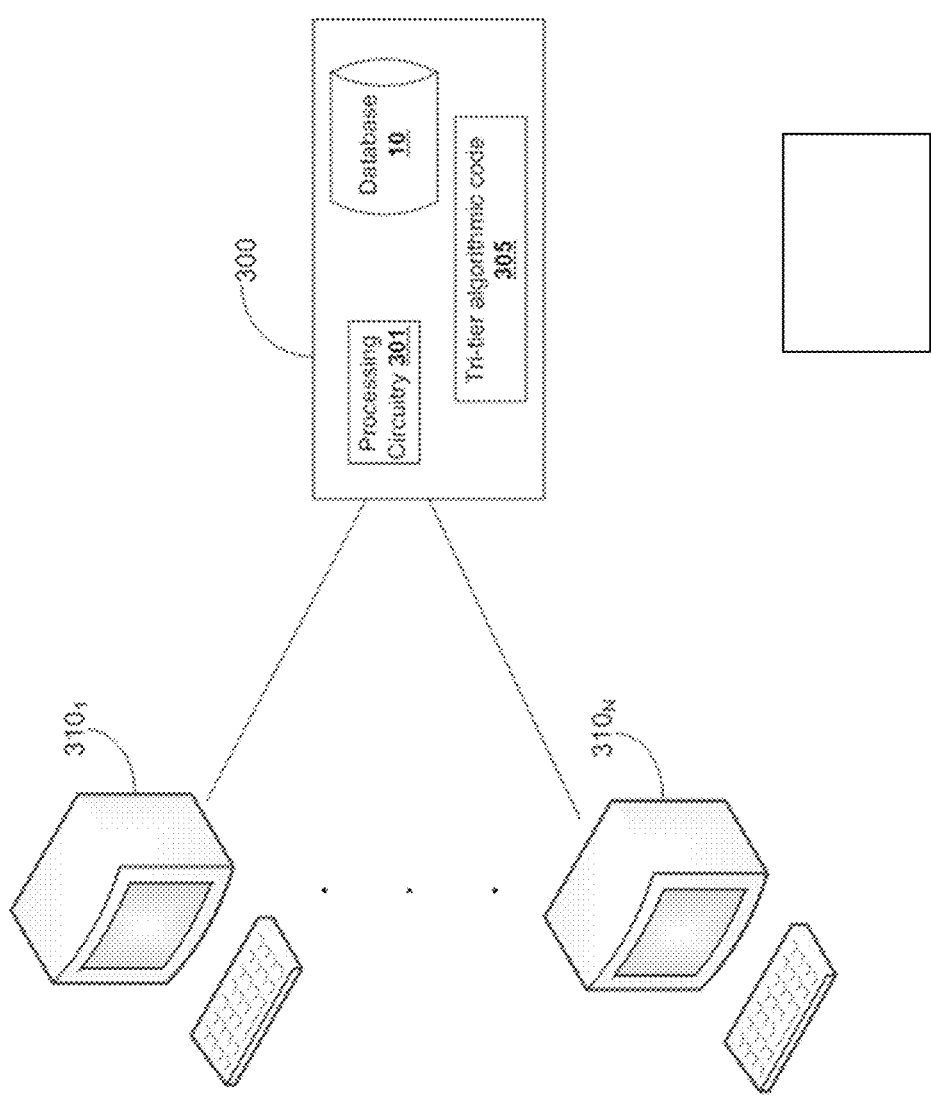
FIG. 3A is a diagram that illustrates components of a system according to an example embodiment of the present invention.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

The system includes an interface by which an authorized user can enter information about qualified entities that have been approved for use of the market platform. The database in turn includes a data structure that stores data that identifies approved participant entities and that further includes a data fields relationally associated with the entity identifications, the data fields including respective flags indicating a participant category. The processing circuitry is configured to execute matching determinations for reassignment of security share data structures between the respective records of the database identifying the different entities according to the tri-tier reassignment paradigm in which the entity data record to which a security data structure is relationally reassigned in the database depends on the respective participant categories to which the flags associated with the offering entities are set.

The tri-tier reassignment paradigm includes a hybrid of two different matching paradigms that operate simultaneously with respect to the same security data structures, where the processing circuitry executes a reassignment in accordance with a priority to reassign within the first matching paradigm. Further, where conditions are such that a security data structure are set as being offered for a reassignment, but cannot be reassigned within the first matching paradigm, the processing circuitry executes a matching determination within the second paradigm, where selection of a particular entity to which to reassign the security data structure depends on priorities and preferences attached to certain ones of the participant entities that are relationally associated in the database with a flag indicating a first participant category over others of the participant entities that are relationally associated in the database with a flag indicating a second participant category. Further, availability of the first matching paradigm is limited to only when the system obtains input by which a data record of a participant entity that is relationally associated in the database with a flag indicating a third participant category is updated to include data indicating an offer for obtaining a reassignment of one or more of the security data structures to the respective participant data record associated with the flag indicating the third participant category.

Thus, according to an example embodiment of the present invention, a flag associated with an entity participant data record can be set to the third participant category where the data record is associated with an initial offerer of underlying assets whose ownership rights attach in accordance with the assignments of corresponding security share data structures to entity participant data records. Depending on input parameters concerning the assets provided upon initial offer of the underlying assets to be assignable via use of the processing system, the processing circuitry stores a security share data structure that identifies a plurality of shares that can be individually reassigned according to the matching algorithm. The database can include in the database sub-data structures, each corresponding to a respective one of the shares.

After an initial one or more approved entities obtain assignment of a respective one or more of the security share data structures, those can be again offered for reassignment to data records of any of the other participant entities, including that of the participant entity which initially offered the underlying security for being subject to reassignment with the system.

The system is configured to include various monetary unit information associated with the security share data structures. In an example embodiment, the monetary unit information includes a datum that is applied universally to all of the security share data structures and data that are specific to particular ones of the security share data structures. For example, the universally applied datum can identify an objective value applied to each of the security share data structures, e.g., determined by the processing circuitry according to preset conditions. For example, such a value can be a net asset value based on net asset value of the underlying asset less total liabilities associated with the underlying asset, divided by the number of security share data structures. Other universally applied data identifications of a number of monetary units at which a data record of one of the participant entities indicates an offer to obtain to it a reassignment of one or more of the security share data structures. Monetary unit informational data that are specific to security share data structures can include an identification of a number of monetary units at which a data record of one of the participant entities indicates an offer to have reassigned from its data record one or more of the security share data structures.

The system is configured to reassign data records after the initial assignment in accordance with the monetary unit information, according to the tri-tier paradigm, as follows. Offers to obtain a reassignment can be input by each of the participant entities, including the initial issuer whose data record is associated with a flag set to the third participant category, preferred participant entities whose data records are associated with respective flags set to the first participant category, and non-preferred participant entities whose data records are associated with respective flags set to the second participant category.

In an example embodiment, offers to acquire assignments of security data structures made in connection with a participant entity record associated with a third participant category flag cannot attach to the offer an identification of monetary units at all or cannot attach to the offer an identification of monetary units other than the universally applied objective value, and reassignments of security data structures to the data record associated with the third participant category flag can only occur at the universally applied objective value. The offer can identify a time window in which the reassignment is to take place, can identify a minimum number of the security data structures that must be obtainable by the reassignment for the reassignment to be executed, and can identify a maximum number of the security data structures offered to be reacquired. In an example embodiment, where there is such an open reassignment order to obtain an assignment of one or more security share data structures by an entity participant, the data record of which is associated with the third participant category flag, then all security share data structures that have been set as available for reassignment by participant entities at the universally applied objective value within the time window set by the offer to acquire are reassigned to the participant entity data record associated with the third participant category flag, up to the maximum indicated number offered to be reacquired. If a minimum number has also been set, then the reassignment is made conditional upon that the number of security share data structures that have been set as available for reassignment by participant entities at the universally applied objective value meets the minimum threshold. If the number of security share data structures that have been made available for reassignment at the universally applied objective value exceeds the maximum number set for the offer to reacquire, then the number of the security share data structures which exceeds the maximum is subject to reassignment matching in a second tier of reassignments. Similarly, if the total number of security share data structures that have been available for reassignment at the universally applied objective value is below any set minimum for the first tier of reassignment matching, then all of the security share data structures that have been made available for reassignment are subject to reassignment matching in the second tier of reassignments. Finally, any security share data structure that is available for reassignment outside any set time period of the reacquisition by the participant entity whose record is associated with the third participant category flag, or that is made available at a number of monetary units that exceeds the universally applied objective value, is subject to matching in the second tier of reassignments. As long as a security share data structure has been made available for acquisition by another participant entity at conditions which satisfy any conditions (including any set maximum) set for reacquisition by the participant entity associated with the third participant category flag, that security share data structure cannot be reassigned with the second tier matching. However, if the conditions (including any set maximum) set for reacquisition by the participant entity associated with the third participant category flag are such that a security share data structure cannot be reassigned to the participant entity associated with the third participant category flag, then the security share data structure is made available for reassignment via the second tier algorithm.

When a security share data structure is provided to the second tier algorithm, the processing circuitry executes a matching algorithm to reassign the security data structure to either a participant entity associated of the first participant category or the second participant category. If data records of both a participant entity associated with the first participant category and a participant entity associated with the second participant category concurrently include pending offers for obtaining a security share data structure and both offers meet conditions set by the data record of the unloading participant entity from which the security data structure is to be obtained, then, if the offer of the data record associated with the second participant category is not greater than the offer of the data record associated with the first participant category by a predetermined percentage, e.g., 5%, then the system reassigns the security share data structure to the data record of the participant entity of the first participant category, regardless of other matching conditions, for example, regardless of which offer to acquire was recorded first in time in the database. On the other hand, if the offer of the data record associated with the second participant category is greater than the offer of the data record associated with the first participant category by the predetermined percentage, e.g., 5%, then the system reassigns the security share data structure to the data record of one of the two participant entities based on matching conditions, for example, selecting the offer to acquire that was recorded first in time in the database.

On the other hand, if a data record includes an offer to unload a security share data structure, but is not reassigned during first tier matching to a participant entity record that is associated with the third participant category flag, i.e., corresponding to the initial asset issuer, for example because the maximum number of shares offered to be reacquired has already been met, the minimum number of shares required for the reacquisition to occur has not been met, the time window set for the reacquisition has closed, or no offer of reacquisition has been made by the third participant category entity, then, even if no offer for acquisition is recorded for any first or second participant category entities, the system automatically reassigns the security share data structure to the data record of the first participant category entity, thereby forcing the first participant category entity to acquire the security share data structure. Thus, while the first participant category entity obtains preference and priority over the second participant category entities when both have pending offers of acquisition, an obligation is placed on the first participant category entity for acquiring security share data structures that were not capable of being reassigned in first tier matching and for which there are no outstanding offers to acquire that can be applied.

In an example embodiment, the obligation for the first participant category entity to acquire assignment of a security share data structure is limited to only those offers to unload at or below the universally applied objective value. According to an alternative example embodiment, the obligation is limited to offers to unload at or below a different value, which may be above the universally applied objective value, which value can be a predetermined percentage or unit number above the applied objective value or can be set based on other conditions, e.g., previous matching offers in the second tier matching platform. For example, there would not be a forced acquisition of a security share data structure which was not previously unloaded because the offer to unload was conditioned on receipt of an exorbitantly high number of monetary units.

In an example embodiment, the system is configured to allow only one participant entity data record to be associated with a first participant category flag. In an alternative example embodiment, the system allows for more than one participant entity data record to be associated with a first participant category flag. According to this latter alternative example embodiment, in an instance where a data record includes an offer to unload a security share data structure, but is not reassigned during first tier matching to a participant entity record that is associated with the third participant category flag, then, even if no offer for acquisition is recorded for any first or second participant category entities, and any conditions for applying the obligated acquisition are met (e.g., the offer to unload is at the universally applied objective value), the processing circuitry is configured to execute a routine for selecting one of the first participant category entities to the data record of which to force reassignment of the security share data structure. For example, in an example embodiment, the processing circuitry moves the acquisition obligation in a round-robin manner between the first participant category entities over time. Alternatively or additionally, the system divides all such outstanding security share data structures that have been offered for unloading among all of the first participant category entities.

According to an example embodiment, a single data record of a single participant entity can be associated by the processor with more than one participant category flag. For example, a data record can be associated with the third participant category and also either the first or second participant category. Accordingly, that data record can include offers for reacquisition on both the first tier platform, e.g., at the universally applied objective value, and the second tier platform, e.g., at a lower value. Similarly, the data record can include offers for reacquisition on the first tier platform and offers for unloading on the second tier platform.

FIG. 1 shows example structures of a database 10 according to an example embodiment of the present invention. FIG. 1 shows the database to include an example participant entity table data structure 100. For example, in the illustrated example, the structure 100 includes a plurality of rows, each corresponding to and including data of a respective participant entity 1-N. The structure 100 further includes a plurality of columns, each corresponding to a respective category of information concerning the respective participant entities to which the rows correspond. For example, in the illustrated example, column 101 is a participant ID column which identifies a particular one of the participant entities approved for participation in the matching platform. Column 102 is a first flag column which is set to one of three participant entity categories, where category three indicates that the participant entity to which the row belongs can acquire reassignment of a security share data structure via first tier matching, category one indicates that the participant entity to which the row belongs is a preferred and priority entity for acquiring a security share data structure via second tier matching and has attached to it an obligation to acquire in certain circumstances, and category two indicates that the participant entity to which the row belongs is a non-preferred and non-priority entity for acquiring a security share data structure via second tier matching.

According to an example embodiment, the system provides for an entity to be able to participate under more than one entity category type. For example, an entity can participate as a category three entity and also as either a category one or category two entity. According to this embodiment, in an example, the structure 100 additionally includes a second flag column 103.

Although not shown, in an example embodiment, the rows of the participant entity table data structure 100 further include columns with identifying information categories, such as name and address, for providing such data for respective ones of the participant entities to which the rows correspond.

In an alternative example embodiment, the system stores a separate entity categorization data structure which identifies in its rows particular participant IDs linked to those of the participant entity table data structure, and further includes the flag information identifying the entity categories to which the participant entities identified by the respective participant IDs of the rows belong.

In an example embodiment, the system further includes an offer table data structure 110, which identifies offers to acquire. In the illustrated example, the structure 110 includes a plurality of rows, each corresponding to and including data of a respective offer 1-N. The structure 110 further includes a plurality of columns, each corresponding to a respective category of information concerning the respective offers to which the rows correspond. For example, in the illustrated example, column 111 is an offer ID column which identifies a particular one of a plurality of offers to acquire which have been input to the system for execution via the matching platform. Column 112 includes the participant IDs which are also included in the participant entity table data structure 100, thereby linking the offers identified in the offer table data structure 110 to respective participant entities identified in the participant entity table data structure 100. Columns 113-116 include condition information concerning the respective offers of the rows of the structure 110. For example, column 113 identifies a particular number of monetary units offered for obtaining assignment of a security share data structure, column 114 identifies a particular period of time, if any, for which the offer remains open, column 115 identifies a minimum, if any, of a number of security share data structure assignment acquisitions required for any of the offers to be executed, and column 116 identifies a maximum (if any) number of security share data structures being offered to be acquired.

According to an example embodiment, a participant entity can be associated with more than one participant entity category, such as both category three, under which acquisitions can be obtained on the tier 1 matching platform, and either of categories one or two, under which acquisitions can be obtained on the tier 2 matching platform. According to this example, in an example, the offer table data structure 110 further includes a tier category 117 identifying under which tier or under which entity category an offer of a respective row is being made.

According to an example embodiment, the offer table data structure 110 further includes data concerning offers to unload one or more security share data structures. According to this embodiment, the particular security data structures that are assigned to the participant entity to which an offer corresponds can further identify, e.g., in a security share ID column 118, particular ones of the security share data structures which are being offered for unloading. Alternatively, any of the security share data structures presently assigned to the offering participant entity, up to the maximum being offered, are arbitrarily selected or selected according to predefined conditions, such as first-in-first-out, last-in-first-out, etc. Further, according to the example embodiment, in which the offer table data structure includes information concerning both offers to unload and offers to obtain assignment, in an example, the structure 110 further includes an offer type column 119 identifying whether the offer is one to unload or one to acquire. Alternatively, such a column can be omitted, with only offers to unload identifying specific security share data structures.

Alternatively, data concerning offers to unload one or more security share data structures can be provided in a security share table data structure.

In an example embodiment, the system further includes a security share table data structure 120, which identifies security share data structures. In the illustrated example, the structure 120 includes a plurality of rows, each corresponding to and including data of a respective security share data structure 1-N. The structure 120 further includes a plurality of columns, each corresponding to a respective category of information concerning the respective security shares to which the rows correspond. For example, in the illustrated example, column 121 is a security share ID column, which identifies respective security share data structures in the corresponding rows, column 122 is a value column which identifies a value of the security share data structure (alternatively, the value can be determined by the system in real-time when needed, and need not be stored in the structure 120), and column 123 is a participant entity ID column 123 which includes the participant IDs listed in the participant entity table data structure 100 and in the offer table data structure 110 thereby linking the security share data structures identified in the security share table data structure 120 to respective participant entities identified in the participant entity table data structure 100 and the offer table data structure 110.

Additional information can also be included in the structures 100, 110, and 120. For example, the system may provide for matching data structures corresponding to many different underlying assets, and even offers to obtain assignment, though they might not identify any particular security share data structure, would include information identifying the particular security for which a share data structure is being offered to be acquired. Thus, the offer table data structure 110 can include an additional column in which such identifications of securities can be provided.

FIG. 2 is a flowchart that illustrates execution of a matching algorithm according to a tri-tier paradigm, including a first tier of matching for assignment to a category three participant entity, a second tier preference and priority matching for assignment to a category two participant entity, and a second tier non-preference/non-priority participant entity (also referred to herein as third tier matching).

At step 200, processing circuitry of the system obtains input generating an offer to unload a security share data structure assigned to one of the participant entities. At step 202, the processing circuitry determines whether the security share data structure unloading offer can be matched with a first tier offer to obtain reassignment of a security data structure. If the offer to unload can be matched to a first tier offer to obtain reassignment, the processing circuitry, at step 204, selects the third participant category entity and proceeds to step 205 to reassign the security data structure to the third participant category entity.

If the offer to unload cannot be matched to a first tier offer to obtain reassignment, the processing circuitry proceeds to step 206, wherein the processing circuitry determines whether the security share data structure unloading offer can be matched to any second tier pending offer to obtain assignment of a security data structure. If the offer to unload cannot be matched to a second tier offer to obtain assignment, the processing circuitry proceeds to step 208 to determine whether the offer to unload meets conditions which would trigger an obligation to obtain assignment of the security share data structure being offered to be unloaded, e.g., whether the offer to unload specifies a number of monetary units that is not greater than a threshold. If such conditions are satisfied, then the processing circuitry updates the database with a reassignment of the security share data structure to the first participant category entity. In an example embodiment, an offer to unload can be made without specifying a particular number of monetary units, in which case the system is configured to perform the reassignment according to predefined criteria, e.g., a number of units indicated by the universally applied datum or based on a number of units used for a last reassignment, or other objective criteria.

If the obligation triggering conditions are not satisfied, the offered security share data structure is not reassigned and the offer to unload remains unmatched until the offer to unload expires or there is a change in the offers to obtain assignment such that a match is found.

If, at step 206, the processing circuitry determines that the offer to unload can be matched to a second tier pending offer to obtain assignment, the processing circuitry proceeds to step 210 to determine if matching offers to obtain assignment are by participant entities of both the first and second participant categories. If not, the processing circuitry reassigns the security share data structure to a matching participant entity record without participant entity preferences.

If, at step 210, the processing circuitry determines that matching offers to obtain assignment are by participant entities of both the first and second participant categories, then the processing circuitry proceeds to step 212 to determine whether preference conditions are satisfied for prioritizing a first participant category entity over a second participant category entity. If the preference conditions are met, e.g., the pending offers to obtain assignment by second participant category entities are not for a number of monetary units that is more than 5% greater than the number of monetary units by the first participant category entity, then the processing circuitry proceeds to step 214 to select the first participant category entity, and proceeds to step 205 to reassign to the selected participant entity.

Otherwise, if the preference conditions are not met, then the processing circuitry proceeds to step 205 to reassign using a non-preferential matching algorithm.

Steps illustrated in FIG. 2 can be executed in a different order, certain steps can be omitted, and still further other steps can be included.

FIG. 3 shows an example system according to an example embodiment of the present invention. A plurality of user terminals $310_1 \ldots 310_N$ are communicatively coupled to a central matching machine 300. The central matching machine 300 includes a database 10 and processing circuitry 301. The database 10 includes information, e.g., as described with respect to FIG. 1, which is updatable in real-time with information input by users operating the terminals $310_1 \ldots 310_N$ for entry of offer information, according to execution of tri-tier algorithmic code 305 corresponding to the method described with respect to FIG. 2. Thus, in real-time, and based entity category information concerning the participant entities, authorized representatives of which operate the user terminals $310_1 \ldots 310_N$, the processing circuitry matches oppositely sided offers to unload and obtain assignment according to a tri-tier paradigm, as described above.

Staggered Auction

Figure 3B:
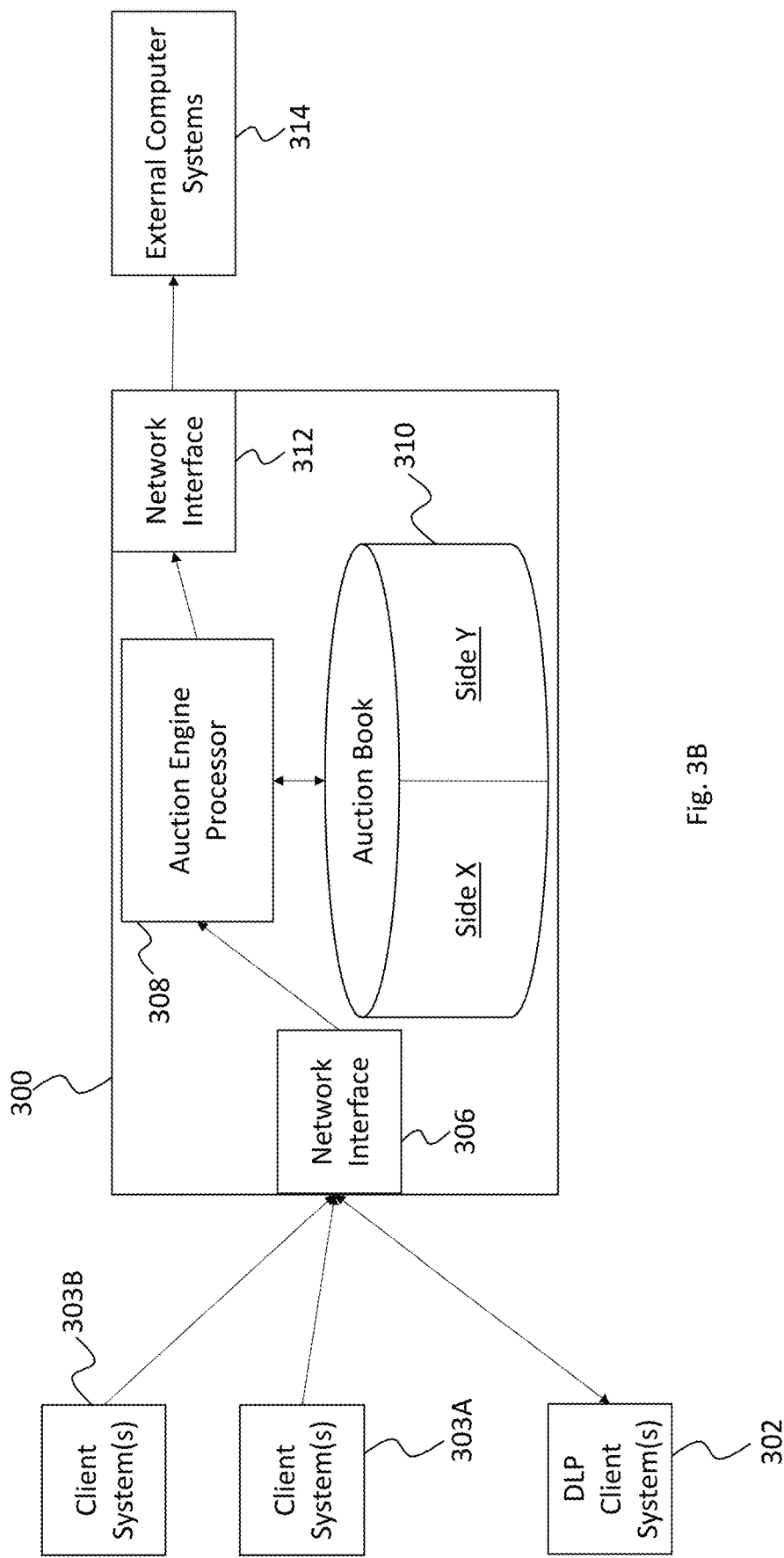
FIG. 3B illustrates a non-limiting example function block diagram of a computer-implemented auction system according to certain example embodiments.

FIG. 3B illustrates a non-limiting example function block diagram of a computer-implemented auction system according to certain example embodiments. Example computer auction system 300 includes a first network interface 306, an auction engine processor 308, a second network interface 312, and an auction book 310.

First network interface 306 may be, for example, a network interface card that is designed and/or configured to receive electronic data messages transmitted by at least external client systems over a communication link (e.g., via the Internet, or other dedicated wired or wireless electronic communication link). Client systems may include DLP client system(s) 302 (e.g., one or more computing systems) along with client system(s) 303A and 303B.

DLP client system 302 is a computer system maintained by a designed liquidity provider (DLP). The role of the DLP in certain example automated and/or electronic auction processes described herein is to provide liquidity for non-public (or in some cases public) equities offered for auction (or trading) via computer system 300. As explained in greater detail below, the DLP is offered one (or more) chances to look at the submitted auction orders for an ongoing auction and transmit an electronic data message to computer system 300 that includes one buy order. Client systems 303A and 303B may be computer systems controlled by other entities that are configured for submitting other electronic data messages that include information for a buy or sell order for the auction.

Electronic messages transmitted by client systems 302, 303A, and 303B are received by network interface 306 that parses the messages and passes the included order information to auction engine processor 308. Auction engine processor may be configured to employ the algorithms shown in FIGS. 4A, 4B, and/or 5.

Auction engine processor 308 can be a combination of hardware (e.g., a hardware processor, such as a central processing unit) and software or just hardware (e.g., a suitably designed application-specific integrated circuit or field programmable gate array). Auction engine processor 308 generally handles incoming orders (buys, sells, etc. . . . ) and adds those incoming orders to the auction book 110.

Auction book 110 can be a data structure (e.g., a database, flat file, list, a the data structure described above, etc. . . . ) that holds multiple entries in electronically accessible memory (e.g., RAM, cache, registers, hard disk drives, etc. . . . ). Typically, an auction book has two sides, side X and side Y, which can be bid and offer/ask or buy and sell sides for the same instrument or equity that is being offered for auction (e.g., an identifier for an equity or other instrument). As noted above, in certain example embodiments the type of equity offered for auction can be private equity interests, which have been typically non-liquid (e.g., it is difficult to find a counter party to carry out a trade).

Computer system 300 includes a second network interface (which may also be the first network interface 306) designed and/or configured to communicate with external computing systems 314. Such systems may include external reporting databases or systems (e.g., that record the results of the auction), settlement services, regulatory authorities, third party observers that are interested in the auction (but not actively participating in the auction), and the like.

Figure 4:
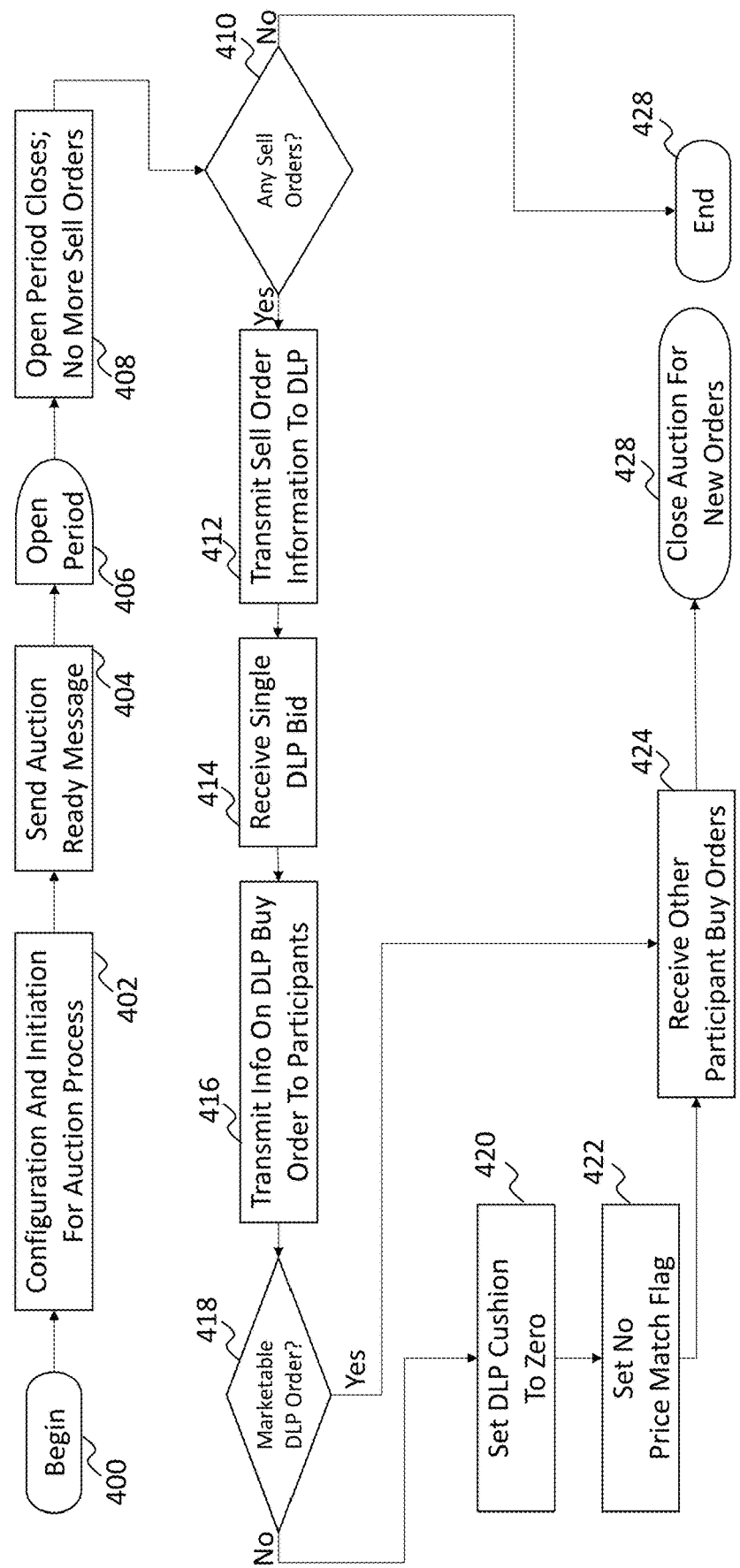
FIGS. 4 and 5 are flow charts of an example computer implemented auction process according to certain example embodiments.
Figure 5:
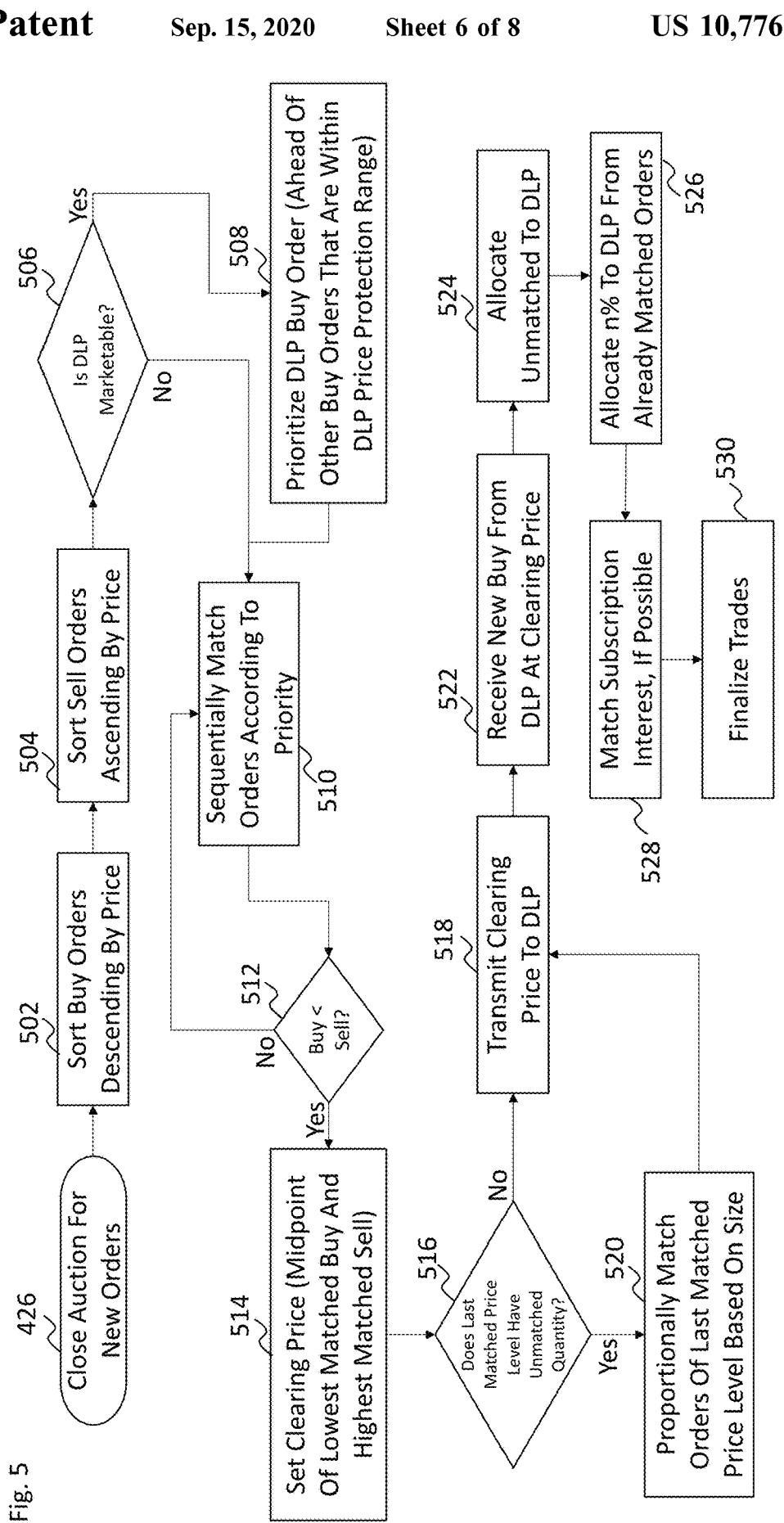

FIGS. 4 and 5 are flow charts for an example computer implemented auction process according to certain example embodiments. The processes may be processes that are run as part of auction engine processor 308. In step 400, the process beings and in step 402, an initialization and configuration process is executed for the to-be-held auction.

Initialization step 402 may occur over several days and may include, for example, e-mailing auction information to platform participants and/or eligible investors to announce when the auction will commence. This may include information that the auction period (e.g., when the submission of buy/sell orders can take place) will begin n days in advance of the auction (e.g., when the submitted orders are matched). Initialization step 402 may include a final check of the auction configuration by staff members that are running the auction. In certain example embodiments, the auction is manually opened or started by the staff. In certain example embodiments, the auction is automatically started according to a predetermined schedule (e.g., 9 AM on Monday). In certain example embodiments, the initiation or start of the auction may be delayed or cancelled by staff members.

Upon initiation of the auction, the computer system sends an electronic data message in step 404 indicating that the auction is ready and has started. This message is transmitted to, for example, clients 302, 303A, and 303B. This message may indicate the start of an "open" period for the auction in step 406 where anyone (e.g., qualified participants) may submit buy and/or sell orders for the item (e.g., a type of private equity for example) that is up for auction. Orders may be submitted, cancelled, or modified without limitation during the open period for the auction (e.g., orders or actions for orders may be submitted at any time within the open period). The period of time for the "open period" may depend on the type of equity being offered and may vary between one hour to multiple weeks. The time period for the auction may be defined by an auction schedule. In certain example embodiments, the open period may be longer (e.g., months) or shorter (e.g., minutes or even seconds).

In certain example embodiments, the open period of the auction (or other period for the auction) may be tracked or monitored by using a timer maintained by the auction computer system (or another computer system). Upon expiration of the timer, the computer system may trigger the end of the open period.

In certain example embodiments, once a client (e.g., client 303A) establishes a connection to the auction computer system using a dedicated external protocol (e.g., a protocol that is used by clients for submitting orders to the auction system) may stay alive (e.g., remain open and active) until the conclusion of the open period for the auction.

In step 408, the open period of the auction is closed by the auction computer system. As a result of closing the open period, no more sell orders may be submitted. Also as a result of the open period ending, the auction computer system may cause electronic data messages to be sent to client systems indicating the open period has closed. Such messages may be transmitted over dedicated communication links that have remained open (as described above). In certain example embodiments, users that are interacting with the auction computer system through a web portal or the like may receive a notification on their workstation.

In step 410, the auction computer system determines (e.g., by querying the auction book stored in electronic memory of the auction computer system) whether there are any (valid) sell orders entered for the auction. If there are no sell orders, then the auction cannot take place and the process ends at step 444. In certain example embodiments, the auction computer system notifies the client computer system that nothing will be done for the auction at this time (e.g., it did not take place). In certain example embodiments, the transmitted message may include an additional explanation for why the auction failed (e.g., that no sell orders were submitted).

If there are sell orders in step 410, then the DLP order entry period for the auction begins by the auction computer system transmitting sell order information to the DLP. This period also begins the price formation phase of the auction while concluding the period in which sell orders could have been submitted. In certain example embodiments, buy orders may still be submitted in this phase, but may not be cancelled.

The transmitted sell order information in step 412 may give the DLP computer system (or a user of that system) a view of the auction order book. In certain example embodiments, the order book view shown and transmitted to the DLP computer system may only show the aggregate size at each price level (as opposed to showing the individual orders at each price level). Alternatively, in certain example embodiments, individual orders may be shown in the order book view that is presented and/or transmitted to the DLP computer system. In certain example embodiments, submitted buy orders may not be visible until the DLP submits an initial buy order or bid. In certain example embodiments, buy order information is initially displayed and/or transmitted to the DLP.

In any event, based on at least the sell order information previously transmitted to the DLP, the DLP system will then transmit a single buy or bid order ("the DLP order") in step 414 to the auction computer system. In step 416, in response to reception of the DLP order, the auction computer system transmits information on the amount and price of the DLP order to all other client computer systems (e.g., 303A and 303B).

In step 418, the auction computer system determines if the DLP order is marketable with respect to any of the sell orders contained in the auction order book. For example, if the only sell orders are for 100 and 101 and the DLP order is for 99, then the DLP order is non-marketable (e.g., there is no possible match). If the DLP order is non-marketable, then the price protection aspects (e.g., as described herein) tied to the DLP order are revoked. This causes steps 420 and 422 to execute that respectively set the DLP cushion (e.g., its price protection range) to zero and set the price match to zero (e.g., the DLP cannot be matched with any sell orders).

In certain example embodiments, a warning or other message may be sent to the DLP computer system indicating the previously submitted buy order is not marketable and that order will not have the price protection privileges it would otherwise be granted. In certain example embodiments, the DLP computer system may then submit a revised order in response to reception of such a warning message. In certain example embodiments, step 418 may be revised to determine if the DLP order is marketable with respect to a certain percentage of the total sell orders, or a total quantity of sell orders. In other words, if the DLP is marketable with respect to a single sell order (or a group of sell orders) that is small in size (e.g., below a set threshold or below a % of the total size of sell orders), but unmarketable with respect to another portion of the sell orders, the system may still determine that the DLP is unmarketable. In certain example embodiments, only a part of the DLP order needs to marketable to satisfy the inquiry. In other example embodiments, the entire quantity of the DLP order needs to be marketable.

In any event, if the system determines the DLP order is unmarketable, then the system sets the DLP cushion (e.g., its price protection range) to zero and sets a no price match flag in steps 420 and 422, respectively.

In step 424, the auction computer system opens the auction up to allow other clients to submit buy orders (e.g., a second buy phase for the auction). As noted in step 416, these clients will have knowledge of the DLP's submitted order and may thus tailor their buy orders based on this information. However, in certain example embodiments, these clients (unlike the DLP) may not have any information on the nature of the sell-side orders. After receiving additional buy orders in step 424, the auction computer system closes the auction in step 428. In certain example embodiments, this stage of the auction process is held for a set time (e.g., 1 day or the like) or may be dynamically determined based on, for example, the amount or quantity of the buy orders being submitted. In other words, if a large number of a buy orders are submitted, the time period for submitting buy orders in step 424 may be extended.

In addition to allowing new buy orders to be submitted, previously submitted buy orders (e.g., those submitted in step 406), may be modified. Modifications may include at least one of a different price (e.g., higher or lower), a larger (or smaller) number of shares for the buy order. In certain example embodiments, order modifications are restricted to either price increases for a buy order and/or increases in buy size for the corresponding buy order. Price decreases or decreases in order size may not prevented.

In certain example embodiments, during this time, the auction computer system may also transmit status updates to those clients that previously submitted sell orders. The information may include auction status information and/or information on the initial bid submitted by the DLP. In certain example embodiments, unlike the DLP, other clients that are buyers or sellers, will not be provided with full information of the order book.

At the end of step 428, the auction is closed by the auction computer system and the process proceeds to FIG. 5 where, among other things, the clearing price and initial share allocations for the auction may be determined.

In FIG. 5, the auction is closed for new orders in step 436. In steps 502 and 504, the buy and sell orders in the order book are sorted by price (e.g., sorting buy orders descending by price and sorting sell orders ascending by price). As part of the sorting of the order book (e.g., giving priority to those orders with "better" prices), the auction computer system checks if the initially submitted DLP order was marketable (e.g., similar to step 418).

If the DLP order is marketable, the process proceeds to step 508. If, however the DLP order is not marketable (e.g., by checking the flags previously set or re-determining the status of the DLP order), then the process proceeds to step 510.

In step 508, as part of the order book sorting process, the DLP order is given priority (e.g., ahead of other orders) that are within the defined price protection range for the DLP order. The price protection level may be a percentage of the price of the DLP order, a fixed number, set globally (e.g., for all auctions), or configured on an individual auction basis. For example, if the DLP order is for 100, the price protection may be 2 ticks (up to 102). In such a scenario, the DLP order is then treated as an order for 102 for purposes of being sorted/prioritized in the order book. Orders that are within the DLP's price protection range may thus be "nudged" behind the DLP order, even though that order has a better bid price.

In step 510, the sorted/prioritized order book is used to sequentially match orders according to their priority within the order book. Accordingly, a buy order that is outside the valid price protection range of the DLP order will be matched before the DLP order (e.g., its buy order for this auction is prioritized ahead of the DLP order). In contrast, an order that is at a higher price level, but still within the price protection range will be matched after the DLP order (as long as the DLP order is marketable).

The sequentially matching in step 510 repeats until the buy price of the next order to be matched is less than a counter-party sell order (or there are no other orders to match) as indicated by step 512.

Figure 6A:
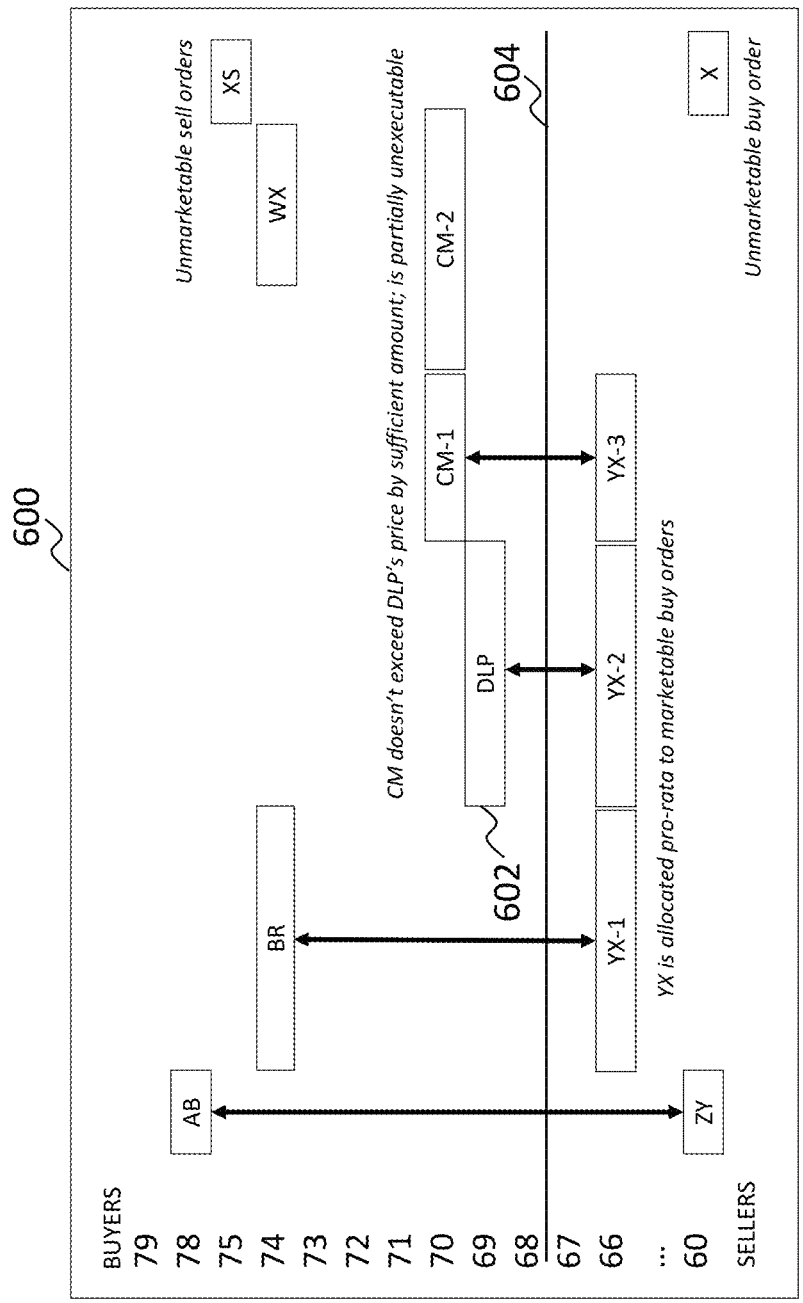
FIGS. 6A and 6B are example charts illustrating how orders are matched according to certain example embodiments.
Figure 6B:
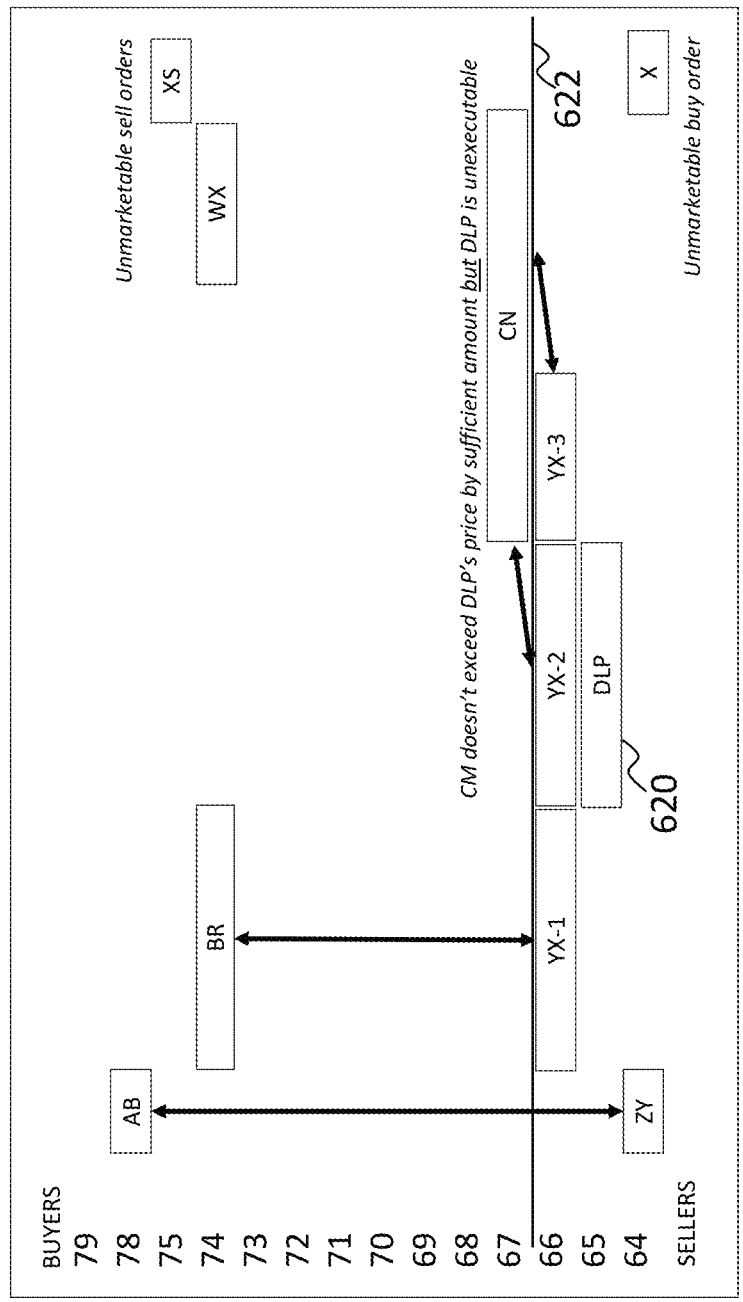

In step 514, the clearing price for the auction is set (e.g., the price at which all trades for the auction will occur). In certain example embodiments, the clearing price is set as the midpoint between the lowest matched buy order and the highest matched sell order. Examples of the clearing price are shown in FIGS. 6A and 6B.

In step 516, the auction engine determines if the last matched price level included unmatched orders (e.g., other orders or other parts of matched orders). If there was unmatched quantity at the last matched price level, then the orders at that last matched price level are proportionally matched based on their respective order sizes. For example, if an order for 10 and an order for 90 are at the same price level and only some of the total 100 can be matched, then then order for 90 will be matched for 90 percent of its total size and the order for 10 will be matched for 10 percent of its size. In certain example embodiments, the DLP order is exempt from this requirement (e.g., because the orders that are at or within the price protection range are prioritized behind the DLP order). In other example embodiments, the DLP order will also be proportionally allocated matches based on its size.

In any event, if there is no unmatched quantity at the last matched price level, or the orders at the last matched price level have been proportionally matched, the clearing price is then transmitted to the computer system of the DLP in step 518.

In response to reception of the clearing price information, the DLP has the option (e.g., the DLP can skip this aspect) to submit another, revised DLP order in step 522. In certain example embodiments, the revised DLP order must be at the clearing price and be for a quantity that is no more than the number of shares included in the initial DLP order. The second chance order for the DLP may only be available if the initially submitted DLP order was determined to have been marketable.

In certain example embodiments, the time period for the DLP to submit a revised order may be for a certain defined period of time (e.g., 1 hour, 1 day, etc. . . . ). This information may be specified during the configuration phase for the auction.

After reception of a revised order (or if the DLP skips submitting a revised order), the DLP may have the option, in step 524, to match against 100% (or less) of any unmatched sell orders. In other words, the DLP may submit a counter-order (or increase its initial order) so as to match against between 0 and 100% of the unmatched sell orders. In certain example embodiments, this further allocation does not count against an allocation percentage that may be associated with the DLP order (as discussed below).

In step 526, a predefined percentage of preliminary matched orders (e.g., as matched in 510) may be re-allocated to the DLP in order for the DLP to fulfill its order (or a portion thereof). For example, if the DLP order was not matched in step 510 (e.g., the marketable sell orders that the DLP could have matched against were matched against better priced buy orders), then the DLP client may submit a revised DLP order at the clearing price for no more than the quantity of the first DLP order. This revised order may be filled (either in whole or in part) with the condition that only a predefined percentage (e.g., 20%, 30%, etc. . . . ) of already matched orders can be re-routed to the DLP in this manner. In certain example embodiments, if the DLP client submits an order that exceeds the number of unexecuted shares, a portion of the shares preliminarily allocated to other buyers may be "crowded out".

Once the DLP has elected to, and to what extent, exercise its allocation right, then in step 528, subscription orders are matched against any remaining unexecuted shares. In certain example embodiments, such subscription orders are allocated against unexecuted shares of the auction pro rata according to the number of shares requested by each subscription order.

In step 530, the auction computer system finalizes the trades (e.g., by sending acknowledgements or confirmations) and performs any other post-processing steps as needed to make the trades final.

FIGS. 6A and 6B are example charts illustrating how orders are matched according to certain example embodiments.

In FIG. 6A, chart 600 shows a finalized view of buy orders AB, BR, DLP 602, and CM (shown divided due to allocation for the CM order). Sell orders ZY and YX are contra-side sell orders. The width of the respective orders in the graphs indicate the size of the orders. DLP 602 submitted an order at 69 (e.g., based on seeing sell orders ZY and YX in the order book. During the secondary buy stage, other clients submitted buy orders AB, BR, and CM. During the sequential matching and prioritization processes, AB is matched against ZY and BR is matched against a portion of YX, YX-1.

The next order on the buy side that is prioritized is DLP order 602 at a price level of 69. Note, DLP order 602 is prioritized ahead of order CM because, in this example, the price protection level is 2 ticks. Accordingly, for purposes of prioritization within the order book, DLP 602 is prioritized as if it were at a price level of 71 (which is a better price than CM). As the DLP order is the next in priority it is matched against another portion of YX, YX-2. The remaining portion of YX, YX-3 is then matched against a portion of CM, CM-1.

The matching process is finished (there are no more valid matches) and a clearing price is calculated at the midpoint price (67.5) between the lowest buy (69 from DLP 602) and the highest sell (66 from YX).

In another example in FIG. 6B, orders AM, BR, ZY, and YX are the same (e.g., the same price level) as shown in FIG. 6A. However, in this example, instead of CM, order CN was submitted at 67 and the initial DLP order 620 was submitted at price level of 65. This price level was marketable when the DLP order 620 was initially submitted. However, after the submission of AM (e.g., during the second buy order submission phase) and its subsequent match to BR, the DLP order 620 becomes un-executable because ZY is matched against AB.

As a result of DLP order 620 becoming un-executable, CN will preliminarily match in full (e.g., as described in step 510 of FIG. 5). Accordingly, the determined clearing price will be 66.5—the midpoint between 66 and 67 (the highest sell order and the lowest buy order). It will be appreciated, that CN is initially matched in full even though it is within the price protection level of DLP order 620. Here, CN is still matched (preliminarily) in full because DLP order 620 is un-executable at that price (e.g., it is skipped over during the matching process).

As a result of the DLP order being initially marketable, but becoming un-executable, the DLP client is given the option to adjust their DLP order to be at the clearing price for the auction. If the DLP client does adjust their price, then the DLP order will be allocated up to n % (e.g., a predefined percentage such as 20% or 30%) of the total matched orders. This number is configurable by the operators of the auction and may result in the DLP order still being matched for its full amount (e.g., against YX-2).

Accordingly, as described above, a computer-implemented staggered auction process that automatically (e.g., in a pre-programmed manner) proceeds through multiple different stages of an auction and provides the ability for a digital liquidity provider (DLP) to submit an initial buy order and then later amend that buy order to a better buy price (e.g., the determined clearing price) is provided. The DLP is offered a price protection range that prioritizes any marketable order submitted during the auction. The price protection allows lower priced buy orders to be prioritized ahead of higher priced buy orders—even though the order book is sorted on price.

Examples

The following are example auction scenarios carried out according to certain example embodiments. The following conditions are generally true for scenarios 1-6. The DLP order has a 30% allocation right and price protection of 1. The minimum price increment for orders is 1. Sell orders have been submitted resulting in an order book with four available price levels on the sell side. The DLP has the following view of the order book (e.g., via step 416 in FIG. 4)

TABLE 1

| Sell Orders | |
| --- | --- |
| Price | Quantity (Aggregate Available At Price Quantity) |
| 6 | 100 (100) |
| 7 | 200 (300) |
| 8 | 300 (600) |
| 9 | 400 (1000) |

In the above table 1, the client computing system of the DLP is provided with information that may indicate the aggregate quantity available at each price level. Thus, price level 7 includes the 200 quantity of its price level and the 100 quantity of price level 6 (for the total of 300).

In a first scenario, the DLP submits an order to buy 100 shares at 5. The DLP's order is not marketable (e.g., it is less than the lowest priced sell order), therefore the DLP relinquishes its price protection and allocation right. Next, in the second buy phase (e.g., step 424) of the auction, a buyer submits an order for 200 at 7. The secondary buy phase closes (e.g., step 428). During the matching phase, the order at 6 is fully satisfied and the order(s) at 7 may be partially satisfied. In certain example embodiments, if there are multiple orders at a price level (e.g., 7 in this case) and they all cannot be fulfilled, then the orders may be fulfilled on a pro-rata basis (as described above). In certain examples, the orders may be fulfilled on a price/time basis. Thus, an order with the earliest timestamp may be fulfilled, in full, before other orders. Next, since the DLP has relinquished price protection and its allocation right (because it submitted a non-marketable order), the DLP may not submit an additional (or revised) order.

In certain example embodiments, subscription orders execute against the unexecuted portion at the clearing price (e.g., which may be 7—the midpoint between the highest sell, and lowest buy). The auction concludes with the buyer acquiring 200 shares at the clearing price and subscribers may obtain 100 shares at 7, distributed pro-rata according to the number of shares requested. In certain example embodiments, unexecuted shares of subscription orders may be routed to the fund for completion in the subscription process.

In a second scenario, the DLP submits an order to buy 200 shares at 7. This is a marketable price, so the DLP has price protection of one dollar and will execute ahead of all buyers at 7 and 8 dollars. But in the second buy stage, a buyer submits an order for 900 at 9 and the auction closes.

In certain example embodiments, the order for 900 at 9 is prioritized ahead of the DLP order and therefore the DLP order becomes unmarketable (the order for 900 at 9 matches against all of the quantity except for 100 at price level 9). The midpoint is calculated (the highest sell order, and lowest buy) at 9. However, the DLP may exercise its allocation right by submitting an order for as many as 200 shares at 9. However, the DLP opts out and does not submit a revised order.

Subscription orders that are available may execute against the remaining unexecuted shares (100 in this case). The auction completes with 1000 shares executed at 9 dollars.

For scenarios 3-6, assume DLP submits an order to buy 100 shares at 6. The order is marketable based on the above table and accordingly the DLP order has price protection and its allocation rights. It has priority over bidders at 6 and 7 dollars.

In a third scenario, another buyer submits an order for 100 at 7 dollars. This is within the DLP's price protection range and accordingly the DLP has priority over the buyer at 7. After close of the auction, the DLP and the seller at 6 execute for 100 against each other (which is the clearing price)

Subscription orders arrive at market price for 6, but no shares are available at 6, and subscriptions are routed to the fund for fulfillment through subscription process. The auction concludes with 100 at a clearing price of 6.

In a fourth scenario, a buyer submits an order for 300 shares at 8 (outside of the price protection range of the DLP). Sell orders at 6 and 7 (i.e., a total of 300) are fully satisfied by the buyer's 300 order. The clearing price is determined at 7.5. In certain example embodiments, this price is rounded up to 8 (or rounded down to 7). The remaining orders at 8 and 9 are unfulfilled and have not been satisfied. For this unfilled orders, the DLP may exercise an allocation right by submitting a 100 share order at 8 dollars (e.g., the clearing price). Since there are 300 shares unexecuted at 8 dollars, the 300 shares (at 6 and 7) already executed are not crowded out by DLP allocation.

Next, available subscription orders arriving at the clearing price (e.g., 8) execute against remaining 200 shares. The auction may conclude with 600 at 8 dollars (e.g., the clearing price).

In a fifth scenario, a buyer submits an order for 700 shares at 8. Orders at 6, 7, and 8 are fully satisfied by this order, but the buy order is not fully executed (600 satisfied, 100 remain unexecuted). In the next phase of the process, the DLP exercises its allocation right by submitting a 100 share order at 8 (the determined clearing price).

DLP is guaranteed an allocation of at most 100 shares since its original order is 100 shares. If its order had been larger, it would be allowed a maximum of 180 share allocation that is, 30% of the available shares at the clearing price (30%×600=180).

The DLP is awarded the full size of its allocation right order (100 shares). Buyer at 8 dollars is allocated a revised 500 shares (e.g., it loses 100 shares to the DLP). No shares are available for subscription orders and the auction concludes with 600 done at 8 dollars. While the buyer at 8 "lost" 100 shares to the DLP, the buyer may never be informed of this fact as the preliminary matching process that identified the first 600 match was just "preliminary" and not reported to any client system.

In a sixth scenario, a buyer A submits an order for 200 shares at 8. Buyer B submits an order for 800 shares at 8. As a result of these orders, the price levels of 6 and 7 are fully satisfied, and the price level of 8 is full satisfied. However, there is not enough quantity to satisfy both Buyer A and B. Accordingly, buyer A and buyer B are allocated shares pro rata according to the number of shares originally ordered by each buyer. For example, buyer A is allocated 20% of the shares available, or 120 shares ((200/(200+800))×600). Buyer B is allocated 80% of the shares available, or 480 shares ((800/(200+800))×600). The clearing price is 8 as a result of these matches.

After the close of the preliminary matching process, DLP exercises its allocation right by submitting an order for 100 shares at 8. As a result of this revision, buyer A and buyer B allocations are revised due to DLP allocation crowding them out.

Thus, buyer A is allocated 20% of the shares available, or 100 shares ((200/(200+800))×500). buyer B is allocated 80% of the shares available, or 400 shares ((800/(200+800))×500).

No shares are available for subscription orders and the auction concludes with 600 shares executed at 8 dollars.

In a seventh scenario, the sell orders arrive for the auction that result in the following order book:

TABLE 2

| Sell Orders | |
| --- | --- |
| Price | Quantity (Aggregate Available At Price Quantity) |
| 5 | 100 (100) |
| 8 | 300 (400) |
| 9 | 400 (800) |

The DLP submits an order for 100 shares at 5. The DLP order is marketable. In the second buy stage, a buyer submits an order for 100 at 7. The buyer for 7 ends up matching against the sell order at 5 for 100. The resulting clearing price may be 6 (or 7 if the price of the buyer is used). The DLP chooses not exercise its allocation right and the auction concludes with 100 shares executed at the clearing price.

An example embodiment of the present invention is directed to one or more processors, which may be implemented using a processing circuit and device, e.g., a Central Processing Unit (CPU) of a Personal Computer (PC) or other workstation processor, to execute code provided, e.g., on a non-transitory hardware computer-readable medium including, for example, a memory device, to perform a method as described herein. The one or more processors may be embodied in a server or user terminal or combination thereof. The user terminal may be embodied, for example, a desktop, laptop, hand-held device, Personal Digital Assistant (PDA), television set-top Internet appliance, mobile telephone, smart phone, etc., or as a combination of one or more thereof. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to one or more non-transitory hardware computer-readable media, e.g., as described above, on which are stored instructions executable by a processor to perform the methods described herein.

The above description is intended to be illustrative, and not restrictive. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

The invention claimed is:

1. A system comprising:
   hardware processing circuitry communicatively coupled to a plurality of terminals; and
   a database that is stored on a non-transitory computer readable storage medium, the database including:

a first data structure that identifies a plurality of participant entities and that associates each of at least a subset of the participant entities with participant category information, by which the processing circuitry is configured to identify each of the participant entities as being at least one of a first participant category, a second participant category, and a third participant category, wherein at least a first participant entity includes the third participant category and one of the first and second participant categories;

a second data structure that identifies assignable share data structures and respective ones of the plurality of participant entities to which the share data structures are assigned; and a third data structure that includes a plurality of offers, with some of the plurality of offers being offers to unload one or more of the share data structures and some of the plurality of offers being offers to obtain assignment of one or more of the share data structures, each of the plurality of offers being associated with at least one of the plurality of participant entities, wherein offers to obtain assignment that are associated with participant entities that include the third participant category are first-tier offers, wherein each first-tier offer includes a specified matching value that is automatically determined without input being provided from one of the plurality of terminals;

wherein the hardware processing circuitry is configured to:

process one or more of the offers to unload using a three-tier matching process in real time as each respective offer to unload is obtained from a corresponding one of the plurality of terminals;

for each respective offer to unload that is processed in real time:

as part of the three-tier matching process for the respective offer and based on a first determination that the respective offer can be matched to an offer to obtain assignment that is a first-tier offer at the specified matching value of the first-tier offer, match the respective offer with the first-tier offer and reassign the share data structure that is associated with the respective offer to another participant entity that is identified by the first data structure, the another participant entity include at least the third participant category; and otherwise:

based on a second determination that the respective offer cannot be matched with any offer to obtain assignment and at least one predefined obligation requirement condition is satisfied, reassign the share data structure that is associated with the respective offer to a participant entity that includes the first participant category, wherein no reassignment occurs based on determination that the at least one predefined obligation requirement condition has not been satisfied;

based on a third determination that the respective offer can be matched with at least one offer to obtain assignment and all offers to obtain assignment with which the respective offer can be matched are associated with participant entities that include a same participant category, reassign the offered share data structure that is associated with the respective offer to a participant entity that is associated with the offers to obtain assignment to which the respective offer is matched;

based on a fourth determination that the respective offer can be matched with an offer to obtain assignment associated in the database with a participant entity that includes the first participant category and an offer to obtain assignment associated in the database with another participant entity that includes the second participant category, and a fifth determination that a preference condition is satisfied, reassign the offered share data structure that is associated with the respective offer to a participant entity that includes first participant category and is included with one of the offers to obtain assignment that the respective offer can be matched; and based on the fourth determination that the respective offer can be matched with an offer to obtain assignment associated in the database with the first participant entity category and an offer to obtain assignment associated in the database with the second participant entity category, and the fifth determination that the preference condition is not satisfied, perform a non-preference matching process to select one of the offers to obtain for matching against the respective offer and then reassign the offered share data structure that is associated with the respective offer to a participant entity for which the selected one of the offers to obtain is associated.

2. The system of claim 1, wherein offers to obtain assignment that are first-tier offers specify a maximum number of share data structures of which the first-tier offer is made.

3. The system of claim 1, wherein, where the respective offer can be matched with the offer to obtain assignment associated in the database with the first participant category and the offer to obtain assignment associated in the database with the second participant category, the preference condition is based on a number of monetary units included in the offer to obtain assignment that is associated with the second participant category not being greater by at least a predefined threshold percentage than a number of monetary units included in the offer to obtain assignment that is associated with the first participant category.

4. A method that is performed on a computer system, the method comprising:

storing, to a database, a first data structure that identifies a plurality of participant entities and that associates each of at least a subset of the participant entities with participant category information, by which processing circuitry of the computer system is configured to identify each of the participant entities as being at least one of a first participant category, a second participant category, and a third participant category, wherein at least a first participant entity includes the third participant category and one of the first and second participant categories;

storing, to the database, a second data structure that identifies assignable share data structures and respective ones of the plurality of participant entities to which the share data structures are assigned;

storing, to the database, a third data structure includes a plurality of offers, with some of the plurality of offers being offers to unload one or more of the share data structures and some of the plurality of offers being offers to obtain assignment of one or more of the share data structures, each of the plurality of offers being associated with at least one of the plurality of participant entities, wherein offers to obtain assignment that are associated with participant entities that include the third participant category are first-tier offers, wherein each first-tier offer includes a specified matching value that is automatically determined without input being provided from one of the plurality of terminals, processing one or more of the offers to unload using a three-tier matching process in real time as each respective offer to unload is obtained from a corresponding one of the plurality of terminal;

for each respective offer to unload that is being processed in real time:

as part of the three-tier matching process for the respective offer and based on a first determination that the respective offer can be matched to an offer to obtain assignment that is a first-tier offer at the specified matching value of the first-tier offer, matching the respective offer with the first-tier offer and reassigning the share data structure that is associated with the respective offer to another participant entity that is identified by the first data structure, the another participant entity include at least the third participant category;

based on a second determination that the respective offer cannot be matched with any offer to obtain assignment and at least one predefined obligation requirement condition is satisfied, reassigning the share data structure that is associated with the respective offer to a participant entity that includes the first participant category, wherein no reassignment occurs based on determination that the at least one predefined obligation requirement condition has not been satisfied;

based on a third determination that the respective offer can be matched with at least one offer to obtain assignment and all offers to obtain assignment with which the respective offer can be matched are associated with participant entities that include a same participant category, reassigning the share data structure that is associated with the respective offer to a participant entity that is associated with offers to obtain assignment to which the respective offer is matched;

based on a fourth determination that the respective offer can be matched with an offer to obtain assignment associated in the database with a participant entity that includes the first participant category and an offer to obtain assignment associated in the database with another participant entity that includes the second participant category, and a fifth determination that a preference condition is satisfied, reassigning the share data structure that is associated with the respective offer to a participant entity that includes first participant category and is included with one of the offers to obtain assignment that the respective offer can be matched; and based on the fourth determination that the respective offer can be matched with an offer to obtain assignment associated in the database with the first participant entity category and an offer to obtain assignment associated in the database with the second participant entity category, and the fifth determination that the preference condition is not satisfied, performing non-preference matching to select one of the offers to obtain for matching against the respective offer and then reassigning the share data structure that is associated with the respective offer to a participant entity for which the selected one of the offers to obtain is associated.

5. The method of claim 4, wherein offers to obtain assignment that are first-tier offers that specify a maximum number of share data structures of which the first-tier offer is made.

6. The method of claim 4, wherein, for all first-tier offers, a number of monetary units offered for obtaining assignment cannot be specified by a user.

7. The method of claim 4, wherein, where the respective offer can be matched with the offer to obtain assignment associated in the database with the first participant category and the offer to obtain assignment associated in the database with the second participant category, the preference condition is based on a number of monetary units included in the offer to obtain assignment that is associated with the second participant category not being greater by at least a predefined threshold percentage than a number of monetary units included in the offer to obtain assignment that is associated with the first participant category.

8. A non-transitory computer readable storage medium storing computer executable instructions for use with a computer system that includes at least one hardware processor, the stored instructions comprising instructions that are configured to cause the computer system to:

store, to a database, a first data structure that identifies a plurality of participant entities and that associates each of at least a subset of the participant entities with participant category information, wherein each of the participant entities is associated with at least one of a first participant category, a second participant category, and a third participant category, wherein at least a first participant entity specifies the third participant category and one of the first and second participant categories;

store, to the database, a second data structure that identifies assignable share data structures and respective ones of the plurality of participant entities to which the share data structures are assigned; and store, to the database, a third data structure includes a plurality of offers, with some of the plurality of offers being offers to unload one or more of the share data structures and some of the plurality of offers being offers to obtain assignment of one or more of the share data structures, each of the plurality of offers being associated with at least one of the plurality of participant entities, wherein offers to obtain assignment that are associated with participant entities that include the third participant category are first-tier offers, wherein each first-tier offer includes a specified matching value that is automatically determined without input being provided from one of the plurality of terminals;

processing one or more of the offers to unload using a three-tier matching process in real time as each respective offer to unload is obtained from a corresponding one of the plurality of terminals, for each respective offer to unload that is being processed in real time:

as part of the three-tier matching process for the respective offer and based on a first determination that the respective offer can be matched to an offer to obtain assignment that is a first-tier offer at the specified matching value of the first-tier offer match the respective offer with the first-tier offer and reassigns the share data structure that is associated with the respective offer to another participant entity that is identified by the first data structure, the another participant entity include at least the third participant category;

based on a second determination that the respective offer cannot be matched with any offer to obtain assignment and at least one predefined obligation requirement condition is satisfied, reassign the share data structure that is associated with the respective offer to a participant entity that includes the first participant category, wherein no reassignment occurs based on determination that the at least one predefined obligation requirement condition has not been satisfied;

based on a third determination that the respective offer can be matched with at least one offer to obtain assignment and all offers to obtain assignment with which the respective offer can be matched are associated with participant entities that include a same participant category, reassign the share data structure that is associated with the respective offer to a participant entity that is associated with one of the offers to obtain assignment to which the respective offer is matched;

based on a fourth determination that the respective offer can be matched with an offer to obtain assignment associated in the database a participant entity that includes the with the first participant category and an offer to obtain assignment associated in the database with another participant entity that includes the second participant category, and a fifth determination that a preference condition is satisfied, reassign the share data structure that is associated with the respective offer to a participant entity that includes first participant category and is included with one of the offers to obtain assignment that the respective offer can be matched; and based on the fourth determination that if the respective offer can be matched with an offer to obtain assignment associated in the database with the first participant entity category and an offer to obtain assignment associated in the database with the second participant entity category, and the fifth determination that the preference condition is not satisfied, perform non-preference matching to select one of the offers to obtain for matching against the respective offer and then reassign the share data structure that is associated with the respective offer to a participant entity for which the selected one of the offers to obtain is associated.

9. The non-transitory computer readable storage medium of claim 8, wherein offers to obtain assignment that are first-tier offers that specify a maximum number of share data structures of which the first-tier offer is made.

10. The non-transitory computer readable storage medium of claim 8, wherein, for all first-tier offers, a number of monetary units offered for obtaining assignment, cannot be specified by a user.

11. The non-transitory computer readable storage medium of claim 8, wherein, where the respective offer can be matched with the offer to obtain assignment associated in the database with the first participant category and the offer to obtain assignment associated in the database with the second participant category, the preference condition is based on a number of monetary units specified by the offer to obtain assignment that is associated with the second participant category not being greater by at least a predefined threshold percentage than a number of monetary units specified by the offer to obtain assignment that is associated with the first participant category.

* * * * *